United States Patent [19]

Louis

[11] 3,820,408
[45] June 28, 1974

[54] SPEED VARIATORS

[76] Inventor: Gerard Alexis Louis, 16, Avenue Anatole, Clichy-sur-Seine, France 92110

[22] Filed: Apr. 12, 1971

[21] Appl. No.: 118,235

[52] U.S. Cl. .............................................. 74/200
[51] Int. Cl. .......................................... F16h 15/08
[58] Field of Search ................................... 74/200

[56] References Cited
UNITED STATES PATENTS

| 3,087,348 | 4/1963 | Kraus | 74/200 |
| 3,540,300 | 11/1970 | Lee et al. | 74/200 |
| 3,581,587 | 6/1971 | Dickenbrock | 74/200 |

Primary Examiner—Leonard H. Gerin

[57] ABSTRACT

In a stepless variator of speed comprising tilting discs in contact under pressure with two coaxial curvilinear respectively driving and driven cone and in view to obtain in all cases better mechanical efficiency: a system of guiding for the tilting movement of a disc formed of three couples of contacting cams, one of each couple fixed the other solidary with the support of the disc; a device to obtain exactly equal speeds at the points of contact of the discs and the cones and the combination of two thrust supporting systems for the exit cone one of which supporting a load only above a given value of the thrust.

6 Claims, 7 Drawing Figures

SPEED VARIATORS

FIELD OF THE INVENTION

The invention relates to improvements in mechanisms comprising two coaxial curvilinear cones of revolution, and, contacting them under pressure, intermediate discs of revolution whose axis situated in substantially radial plane is tilted in that plane to displace the points of contact of the cones and the discs on both elements and consequently to provide the variation of speed of the driven cone.

BACKGROUND

In the variators of this kind already known the tilting of a disc is generally obtained by its rotation around a fixed axis perpendicular to the plane containing both the axis of the cones and the axis of the disc; accessorily are provided minute displacements either to transmit the thrust to the driven cone or to equilibrate the forces acting on the discs, these displacements being equal to zero for perfectly shaped and absolutely rigid parts. With that rotation around a fixed axis is provided that either the meridian profile of the disc or the meridian profile of the cones be a circumference with its center on said axis. The tangents at the two points of contact of the profiles in the plane of the axes cannot then converge on the point of intersection of these axes, except for two positions of the disc. It results from this that for all the other positions supplementary frictions appear which decrease the mechanical efficiency of the variator.

Some patents have been delivered for mechanisms which secure the convergence of the tangents on the point of intersection of the axes but these mechanisms ignore the conditions of transmission of power and impose, for the cones and the discs, profiles quite inadequate to industrial applications.

Other causes of frictions are the small differences, resulting from the inavoidable variations in the machining, between the radiuses on each cone at its points of contact with the different discs and the corresponding different speeds at these points.

Another cause of mechanical losses of power, very important in a variator delivering a constant power at the exit, results in the fact that, the thrust being large at slow speeds on the exit thrust bearing, this bearing must be a large one and create big losses at the higher speeds.

OBJECT OF THE INVENTION

The variator according to the invention suppresses all these supplementary power losses. It permits to obtain in all cases for the discs, whatever may be the profiles of the cones and discs and the tilting movement, the correct guidance providing the intersection of the tangents at the points of contact of the profiles on the points of intersection of the axes of the cones and the discs. It provides contacts on the same parallel on each cone; it avoids large bearings turning at high speeds.

SUMMARY

These results are obtained:

By the use, to guide the tilting movement of each disc, of three couple of contacting surfaces of cams, one of each couple being solidary with the support of the disc, the other being fixed on the frame, the latter surfaces being the enveloppe of the former one in the desired movement.

By supporting the thrust of each cone on a ball whose center is substantially on the axis of the cone and by transmitting the power to or from these cones by a mechanism applying a torque without any transversal action. The reactions at the points of contact of a cone with the discs must then intersect at a point on the axis of the cone and the normals from that point to the meridians of the cone corresponding to each disc meet these meridians on the same parallel.

By supporting the thrust of the driven cone by a system of two bearings, the larger one being discharged at the higher speeds.

DRAWINGS

One preferred form of the invention is illustrated in the accompanying drawings in which.

PREFERRED EMBODIMENT

Figure 1:
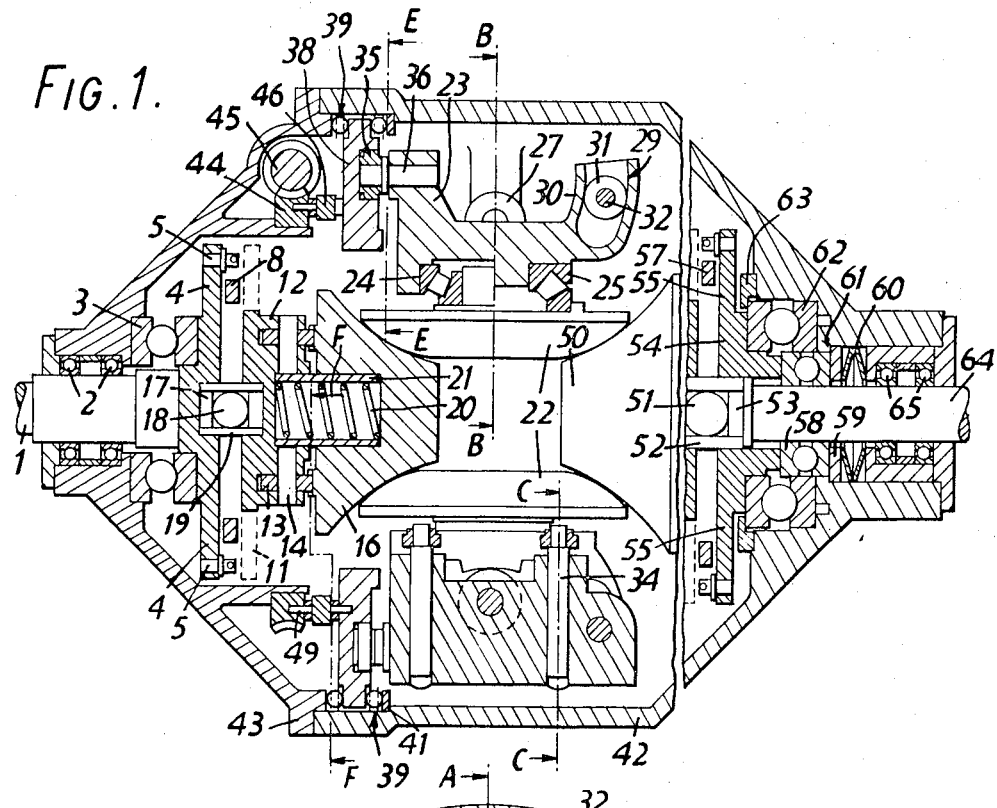
FIG. 1 is a section of the variator on the lines AA and DD FIG. 2
Figure 2:
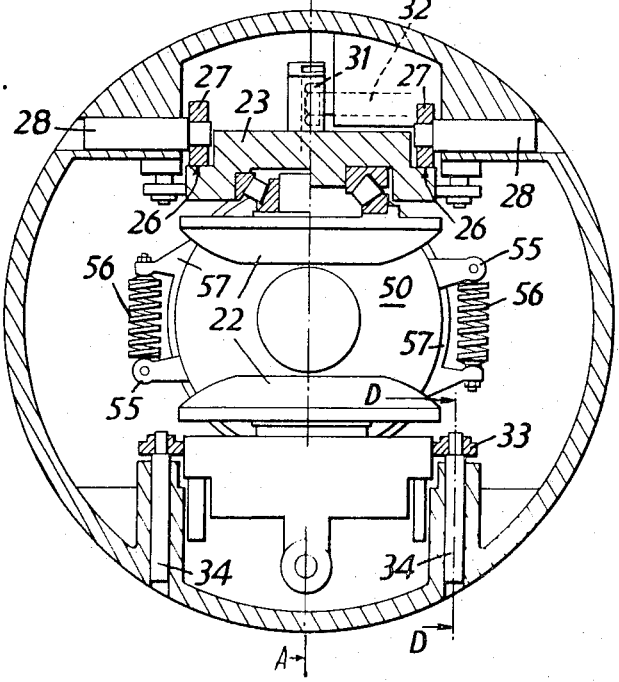
FIG. 2 is a transversal section on the lines BB and CC FIG. 1
Figure 3:
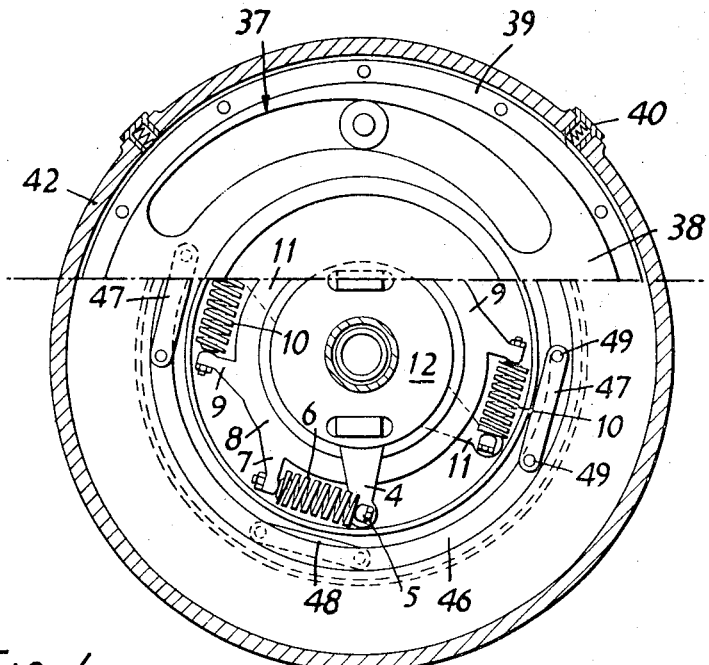
FIG. 3 is a transversal section on the lines EE and FF FIG. 1
Figure 4:
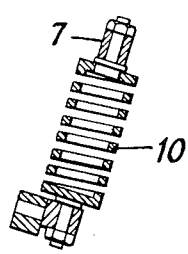
FIG. 4 is a partial section on the line HH FIG. 3
Figure 5:
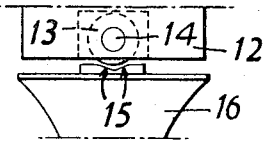
FIG. 5 is a partial side view of the compressing device

The annexed drawings illustrate as an example a realization of the mechanism according to the invention and show other particularities.

The driving axle 1 of the variator, running in the bearings 2 and backed on to the thrust bearing 3, has two arms 4, 180° apart, supporting a pin 5 at which is attached one extremity of the springs 6, the other being fastened to the arm 7 of a ring 8. That ring has two other arms 9 connected in the same way by the springs 10, whose axes are perpendicular to those of the preceding ones, to the two arms 11 of the socket 12 supporting the driving rollers 13 free to turn on their axles 14. These rollers press on the slopes 15 forming one piece with the driving conoid 16, and communicate to it both the driving torque and a thrust proportional to that torque. The reactive thrust on the rollers, and consequently on the part 12 is transmitted through the hardened parts 17 and the ball 18 to the axle 1 and the thrust bearing 3. The ball 18 is adjusted in a sleeve 19 easily deformed elastically under small stresses and centered in the parts 1 and 12. The sleeve 21 forming one piece with 12 insures the coaxiality of that part with the conoid 16, in which it can turn, and lodges a spring 20 which provides an initial pressure.

The conoid 16, applied on the discs 22 by the forces due to the spring 20 and the slopes 15, drives the discs, preferably three in number, 120° apart (only two are represented to simplify the drawings). These discs are mounted in the support 23 by the medium of either a rigid 24 or a spherical 25 thrust bearing, according to the construction of the variator. The support 23 is positioned on one hand by the surface 26, divided into two for symetry reasons, pressing on the rollers 27 turning on their axles 28, on the other hand by the parallel surfaces 29 and 30 contacting the corresponding rollers here merged into one 31 turning on its axle 32. The tilting movement of the support 23 is operated by the roller 35 turning on its axle 36 and engaged in the spiraloid groove 37 of the circular plate 38 coaxial to the conoids and free to displace itself slightly in its plane on the balls 39 rolling between the plate and, from one side on the ring 41 fitted in the frame 42 of the variator, from the other side on the rim of the cap 43, these balls being supported by the frame 76 maintened in a substantially centered position by the springs 40. The cap 43 is fixed on the frame 42 by screws not shown.

The rotation of the plate is operated from the worm gear 44, driven by the worm 45 with the help of the intermediate ring 46 connected from one side to the worm gear 44 by two rods 47 and from the other side to the plate 38 by two other rods 48, 90° apart from the first ones, these rods 47 and 48 being linked to the pins 49. The support 23 is positioned lateraly by the rollers 33 turning on their axles 34.

The driven cone 50 transmits, as described above for the conoid 16, the thrust to the ball 51 adjusted in the sleeve 52 elastically deformed under small stresses, and through the piece 53 to the collet of the exit axle 64 and to the socket 54 which has two arms 55 and receives the driving torque by a system, comprising the springs 56 and the intermediate ring 57, similar to the one already described. The part 54 rests constantly on the thrust bearing 58, abuted on the ring 59 pushed by an elastic component such as the Belleville washers 60, against the shoulder 61 of the frame. On the contrary a few hundredth of m/m are missing, at rest, to make contact between the socket 54 and the large thrust bearing 62 lodged between the frame and the cap 63. When the variator rotates under small loads the thrust bearing 62 is out of action and do not cause mechanical losses; the load growing the play between 54 and 62 decreases owing to the setting of this last one; when the thrust on 58 exceed the force exerted by the Belleville washers 60, the thrust bearing 62 supports the difference between these two forces. The parts are calculated in order that for the higher exit speeds only the thrust bearing 58 is in action. The exit axle 64 driven by the splines of the socket 54 rotates in the bearings 65.

Figure 6:
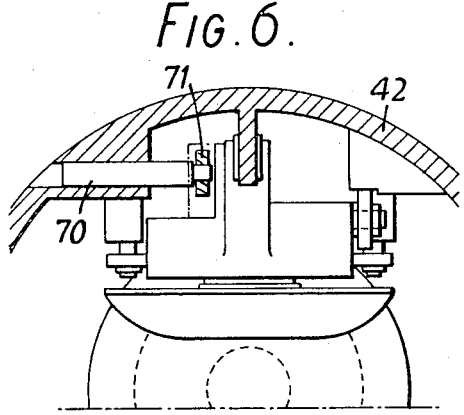
FIG. 6 and FIG. 7 show schematically a variant of the mechanism.
Figure 7:
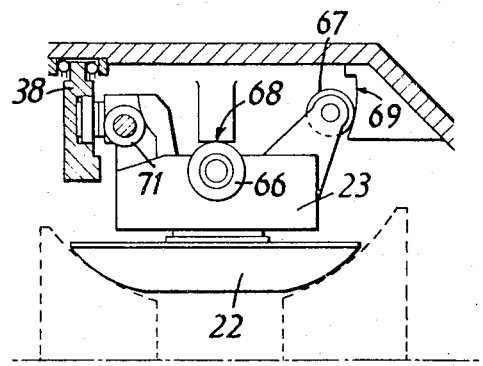

The arrangement of the surfaces guiding the support of the disc can be different from the one described: an example of the possible dispositions is schematically shown in the FIG. 6 and 7 in which the support 23 supports the rollers 66 and 67 resting respectively on the fixed surfaces 68 (divided into two) and 69; for the third couple on the contrary, it is the surface 70 (divided into two) which is solidary with the support 23 and the roller 71 (divided into two), turning on the axle 72, which is supported by the frame of the variator.

I claim:

1. In a variable speed transmission, or variator, comprising, in a casing, driving and driven abutted axles operatively connected respectively with, two coaxial input and output members in form of cones having toroidal surfaces, a plurality of circumferentially spaced profiled disks disposed between and in driving contact with said surfaces and transmitting the torque from the input member to the output member, for each disk: a concentric axle maintaining said disk, a support for each axle, rollers contacting the support to maintain the axis of the disk in a radial plane of the variator and means to impose to the support and the disk the speed-varying tilting movement:

a guiding system of the support for said tilting movement comprising only, for each disk: on one hand three cams solid with the casing, on the other hand three cams solid with the support of the disk and disposed to contact in as many points, respectively the three cams fixed on the casing; the cams of one contacting pair being preferably separated in two halves placed on each side of the radial plane of the axis of the disk; the instantaneous axis of rotation of the support in its tilting movement being the intersection of the planes normal to the profiles of the cams at their points of contact.

2. A mechanism according to claim 1 in which one cam of each contacting pair is circular, in form of a roller, and free to turn around its axis.

3. A mechanism according to claim 2 in which the circular cams of two pairs are merged into one, the two other cams of these pairs acting on opposite sides of the former.

4. A mechanism of the kind described in which the tilting movement of the disks is obtained by the action on organs solid with their supports of spiraloid grooves or tenons machined in a plate perpendicular to the axis of the cones and substantially centered on the axis of the cones.

5. A mechanism according to claim 4 in which the plate is free to have small displacements in its plane.

6. In a mechanism according to claim 1:

an abutment system for the driven abutted axle comprising, in combination: a socket solid with this axle, a first coaxial thrust bearing contacting on one face this socket, a collar sliding axially contacting the other face of said thrust bearing, an elastic member pushing the collar against the bearing, a fixed shoulder limiting the displacement of the collar; a second larger thrust bearing supported by the casing and whose free face is constructionaly at a distance of a few hundredths of millimeter from the socket, contact taking place between the socket and this second thrust bearing when the thrust on the abutted axle surpasses the force applied by the spring on the collar contacting the first thrust bearing.

* * * * *